April 30, 1963 H. C. FLINT 3,087,756
VEHICLE SEAT
Filed Oct. 22, 1959
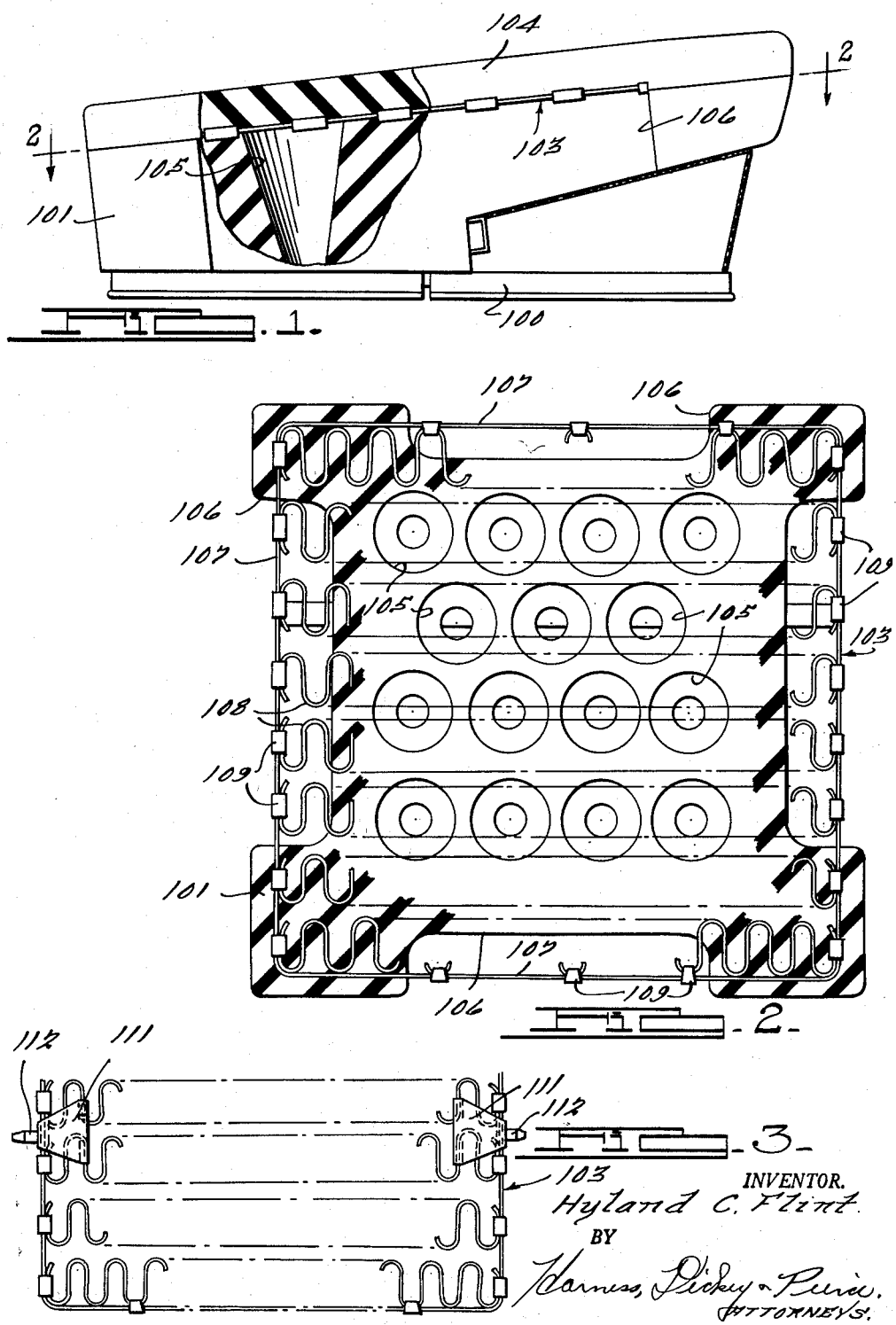
INVENTOR.
Hyland C. Flint
BY
Harness, Dickey & Pierce
ATTORNEYS.

United States Patent Office 3,087,756
Patented Apr. 30, 1963

3,087,756
VEHICLE SEAT
Hyland C. Flint, 40550 W. Ten Mile Road, Novi, Mich.
Filed Oct. 22, 1959, Ser. No. 847,930
4 Claims. (Cl. 297—340)

This invention relates to automotive vehicle seats, and particularly to a seat cushion of the composite type made of two dissimilar materials which operate in conjunction with each other to produce the proper rate and longevity thereto, and is a continuation-in-part of the copending application of H. C. Flint, Serial No. 646,799, filed March 18, 1957, now Patent No. 2,925,120.

The present invention pertains to a seat cushion for an automotive vehicle which has a low rate and which has a combined spring and snubbing action and which may be connected with the back cushion for unison action therewith. Automotive seat cushions, particularly for trucks and other vehicles performing off-the-road service, are subject to so much shock load as to have an extremely short life. This is caused by the fracture of the wire of the springs, whether of the coil, sinuous strip, formed wire, or other type. To withstand the substantial shock which produces the rupture of the wire of the spring elements, the present invention contemplates the use of other media to produce a snubbing action to resist the shock which occurs to the seat cushion during off-road operation of the vehicle. Such media may be air, foam rubber, or a combination of air and foam rubber. The metal spring elements are constructed in such a manner as to provide a low rate desired in the cushion for preventing the pitching of the operator from the seat surface while the enclosing media provides the snubbing action which substantially removes shock from the spring elements of the cushion. The cushion may be made from spring strips, as disclosed in the parent application and completely enclosed with a snubbing material, such as foam rubber.

A base of a predetermined shape is covered by a block of foam material shaped to produce a desirable support and contour. A load supporting frame of sinuous spring strips may be placed over the foam rubber surface and covered with a foam rubber pad, all of which is secured in unit relation. The block of foam material under the supporting frame is preferably cut away along the front, sides and rear edges to provide the proper deflection at the edges in order to permit the load supporting frame to deflect more nearly at the same rate as the point of load concentration directly under the seated person. As a seated person describes an arc or oval shape to any seating material, it can be seen that after the load is imposed and is static, the edges of the described cushion will not have moved downwardly as far as the point of load concentration. However, it has been found that after the load is applied and a jolt of a vehicle produces additional vertical travel, the cut back edges of the described cushion will move very closely at the same rate as the point of load concentration for the reason that under the point of concentration the foam material has become dense while under the side edges of the load supporting frame there is still freedom of vertical travel. This is particularly important when it is desired to have this type of cushion used in a unison action seat where the back has arms reaching forwardly and pivoted to a stud that is attached to the load supporting frame. It can thus be seen that as the oval shape of a person is seated, the concentration point will move down first while the edges remain relatively quiet, but as the material under the point becomes dense, at static condition, the edges thereafter will be sensitive to any slight movement of the point. This is important in a relatively shallow seat as it does not use up travel distance for the back rest until static condition is reached. To further properly utilize this type of cushion, holes of various shapes and location may be provided throughout the seating area of the foam material.

Accordingly, the main objects of the invention are: to provide a seat cushion having load supporting springs cooperating with foam material in such manner as to reinforce the springs and reduce the shock load thereon; to form a seat cushion from metal spring elements and resilient material, so related as to control the rate of the cushion while absorbing shock which is applied thereto; to form a cushion from resilient metal and plastic materials which are interrelated to produce longevity to the cushion even though subject to extreme shock, having studs on which are pivoted arms of a back cushion to produce unison action with the seat; to build up a composite cushion from a frame of predetermined varying depth having a resilient material resting thereon and provided with apertures therethrough and relieved edges for supporting a frame of resilient wire strips beneath a top pad which forms a unit construction which permits contouring and deflection to a predetermined degree while controlling the rate and the damping of the spring action when an occupant is carried over rough terrain in a vehicle containing the occupied seat; and, in general, to provide a composite seat of proper rate and damping action which is simple in construction, which has an extended life, and which is economical of manufacture.

Other objects and features of novelty of the invention will be specifically pointed out or will become apparent when referring, for a better understanding of the invention, to the following description taken in conjunction with the accompanying drawings, wherein:

FIGURE 1 is a broken view in elevation of a seat cushion embodying the features of the present invention;

FIG. 2 is a sectional view of the structure illustrated in FIG. 1, taken on the line 2—2 thereof, and FIG. 3 is a view of the structure illustrated in FIG. 2, showing another form which the invention may assume.

In FIGS. 1, 2 and 3, is illustrated a frame 100 having a block of foam rubberlike material 101 secured thereto, with a formed wire frame 103 placed upon the top of the block 101 which is maintained in position by the foam rubber pad 104 when secured to the top surface of the rubber block 101 through the areas between the spring strips 108 of the frame. The rubberlike block 101 may be provided with a plurality of apertures 105 which control the deflection of the material, with the front, rear and side edges 106 thereof cut away to permit the deflection of the border wire 107 which is secured about the edge of sinuous spring strips 108 by bands 109. The seat cushion is upholstered in the usual manner, with the proper contouring thereof controlled by the apertures 105 in the block of foam rubberlike material 101 and the frame 103 which rests upon the block beneath the pad 104. The frame also controls the degree of contour and the distribution of the load over the block 101, all of which results in a seat which is substantially indestructible. None of the material is overstressed, even by the shock of off-road operation, and a comfortable and indestructible seat cushion results therefrom.

In FIG. 3, the sinuous spring frame 103 is illustrated as being provided with angle plates 111 at each of the side edges by having portions which bend around portions of the spring strips and the border wire 107. The plates 111 have studs 112 projecting therefrom for the purpose of supporting the ends of the arms of the back cushion frame. The studs 112 are located at the sides of the foam rubberlike block 101.

The seat cushion herein illustrated and described has durability to withstand the operation of the vehicle over rough terrain. The cushion is of the composite type having load bearing wire element employed in combination with foam rubberlike material in which the element is embedded and supported thereby. The cushion provides comfort and contour while preventing the occupant from being thrown and the load bearing wire element from being overshocked due to the rapid movement between the foam rubber base of the seat cushion and the occupant. While the seat cushion may be employed independently of the back cushion, studs are illustrated at the sides of the seat cushion in FIG. 3 to which the ends of arms of the back cushion are pivotally secured to have the back cushion move in unison with the load bearing element of the seat cushion.

What is claimed is:

1. In a cushion construction, a base, a block of foam rubberlike material disposed on said base, a frame of wire strips connected at the ends to a border wire and disposed upon said block, a pad of similar foam material disposed upon said frame and secured to the surface of said block for retaining the pad and frame in unit relationship, and studs on said frame projecting outwardly of the block.

2. In a seat cushion construction, a base, foam rubberlike material supported by said base, a frame comprising a plurality of spring strips spanning opposite sides of a border element and secured thereto, said frame being mounted within the top portion of said foam rubberlike material and being disposed inwardly of the side edges of said foam rubberlike material and supported solely thereby so that said border element may deflect with the rubberlike material and the spring strips may deflect with the rubberlike material and the border element and also independently of the border element.

3. In a seat construction, a base, a block of foam rubber on said base, a frame made of spring strips disposed within the block a sufficient distance below the top thereof to have the portion extending above said strips form a pad, a border wire about said strips, and cutout portions in said block to expose side portions of said border wire for free deflection.

4. In a seat construction, a base, a block of foam rubber on said base, a frame made of spring strips disposed within the block a sufficient distance below the top thereof to have the portion extending above said strips form a pad, a border wire about said strips, and cutout portions on four sides of the block exposing portions of said border wire at said four sides for free deflection.

References Cited in the file of this patent

UNITED STATES PATENTS

| | | |
|---|---|---|
| 1,756,825 | Hess | Apr. 29, 1930 |
| 2,445,030 | Mandelbaum | July 13, 1948 |
| 2,459,755 | Flint | Jan. 18, 1949 |
| 2,459,756 | Flint | Jan. 18, 1949 |
| 2,459,758 | Flint | Jan. 18, 1949 |
| 2,537,640 | Flint | Jan. 9, 1951 |
| 2,897,879 | Brown et al. | Aug. 4, 1959 |
| 2,936,823 | Neely | May 17, 1960 |

FOREIGN PATENTS

| | | |
|---|---|---|
| 814,509 | Germany | Sept. 25, 1951 |
| 823,494 | Germany | Dec. 3, 1951 |
| 937,144 | Germany | Dec. 29, 1955 |